March 25, 1941.  C. H. WILLIS  2,236,254

ELECTRIC VALVE CONVERTING APPARATUS

Filed Oct. 11, 1938

Inventor:
Clodius H. Willis,
by Harry E. Dunham
His Attorney.

Patented Mar. 25, 1941

2,236,254

UNITED STATES PATENT OFFICE 2,236,254

ELECTRIC VALVE CONVERTING APPARATUS

Clodius H. Willis, Princeton, N. J., assignor to General Electric Company, a corporation of New York Application October 11, 1938, Serial No. 234,448

9 Claims. (Cl. 175—363)

My invention relates to electric valve converting apparatus and more particularly to such apparatus utilized between direct and alternating current circuits, one of which has a constant current characteristic.

It is known that it is not uncommon for electric valve converting apparatus to generate harmonic current components which are reflected back into the source of supply. Such harmonic components often necessitate apparatus of a higher voltage rating than would be necessary if such harmonics could be suppressed or prevented. Where the supply circuit is one of alternating potential such harmonics distort the wave shape of the alternating current supply circuit.

It is an object of my invention, therefore, to provide an improved electric valve converting apparatus for transmitting energy between an alternating current circuit and a direct current circuit, one of said circuits having a constant current characteristic which will overcome the above-mentioned disadvantages of the arrangements of the prior art and which will be simple and reliable in operation.

It is a further object of my invention to provide an improved electric valve converting system for transmitting energy between an alternating current circuit and a direct current circuit in which harmonic current components are suppressed in the alternating current circuit by supplying thereto harmonic alternating current components of equal magnitude and opposite phase to those normally introduced into the alternating current circuit.

It is a still further object of my invention to provide an improved electric valve converting system operating between alternating and direct current circuits, one of which has a constant current characteristic, in which the reactive voltage is increased, and the voltage across the capacitive elements of the apparatus is decreased.

Figure 1:
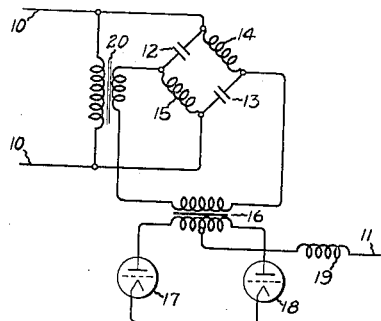

For a better understanding of my invention together with other and further objects thereof, reference may be had to the accompanying drawing and its scope will be pointed out in the appended claims. Fig. 1 of the drawing illustrates one embodiment of my invention, Fig. 2 illustrates a modification embodying the principles of my invention, and Fig. 3 shows the application of my invention to an arrangement supplied from a polyphase source of alternating current.

Referring more particularly to Fig. 1 of the drawing I have shown therein an alternating current circuit 10 and a direct current circuit 11, one of said circuits having a constant current characteristic. For the purposes of simplicity in description and explanation it will be assumed that energy flows from the alternating current circuit to the direct current circuit although it is to be understood that my invention is equally applicable when the energy flow is in the opposite direction. A monocyclic network comprising a plurality of branches of serially connected reactances of opposite kind, such as the capacitors 12 and 13 and the inductors 14 and 15 arranged to form a closed circuit and having alternate junctures of reactances of opposite signs connected to a different one of the conductors of the alternating current supply circuit 10. It of course will be apparent to those skilled in the art that this network may be modified by substituting a reactor for the capacitor 13, which reactor will be equal to the reactance of the reactor 14 so as to provide a neutral point for the connection to one side of the primary winding of a supply transformer 16 of the electric valve rectifying apparatus. This electric valve converting apparatus may be any one of a number of types commonly utilized in the art but as shown comprises two electric valves 17 and 18 connected between the outer extremities of the secondary winding of the transformer 16 and one side of the direct current circuit 11. The other side of the direct current circuit 11 is connected through a suitable smoothing reactor 19 to an intermediate point of the secondary winding of the transformer 16. The remaining terminal of the primary winding of the transformer 16 is connected through one winding of a transformer 20 to the remaining juncture of the monocyclic network. The other winding of the transformer 20 is connected to the alternating current circuit 10. While the electric valves 17 and 18 have been shown as individual valves it of course will be apparent to those skilled in the art that any suitable valves including those of the multi-anode, single cathode type may be employed although it is preferable to utilize valves of the type having an anode and a cathode enclosed within an envelope containing an ionizable medium. The valves 17 and 18 have been shown as each having an anode, a cathode, and a control electrode or grid, since when the energy flows from the direct current circuit to the alternating current circuit the electric valve converting apparatus operates as an inverter and the valves will be controlled by any one of a number of inverter control circuits well known in the art. The transformer 20 serves to introduce into the alternating current circuit 10 harmonic components of equal magnitude and opposite sign to the harmonic components which would be introduced into the alternating current circuit by the action of the electric valve converting apparatus.

The operation of a monocyclic network and of a rectifier of the type illustrated is so well known to those skilled in the art that it is believed to be unnecessary to set forth a detailed mode of operation. By indicating the circuit through which the harmonic components flow it is believed that the operation of the apparatus will readily become apparent. This circuit for the harmonic components may be traced from the right-hand terminal of the primary winding of the transformer 16 to the juncture between the capacitor 13 and inductor 14, the harmonic component flowing through the capacitor 13 to one side of one winding of the transformer 20, through this winding to the juncture between the inductor 14 and capacitor 12, through the capacitor 12, through the other winding of the transformer 20 and back to the left-hand terminal of the primary winding of the transformer 16. From this it will be apparent that the flow of the harmonic component through one side of the transformer 20 is in an opposite direction to the flow of the same harmonic component to the other side of the transformer 20. The transformer 20 is so designed as to neutralize the principal harmonic components which are generated by the electric valve converting apparatus. This has the effect of increasing the reactive voltage appearing across the inductors 14 and 15 and of decreasing the voltage appearing across the capacitive elements 12 and 13. Since a decreased power rating of the capacitors 12 and 13 is possible, it will be apparent that a distinct economic advantage is obtained thereby.

Figure 2:
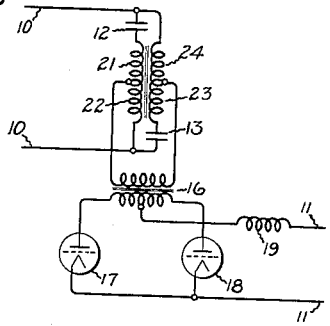
Figure 3:
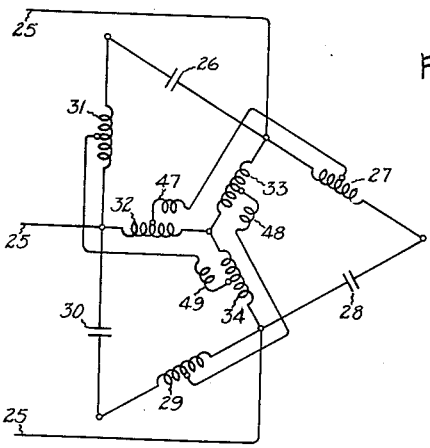

In Fig. 2 there is shown a modification embodying the principles of my invention and in this figure those components similar to the components in Fig. 1 have been given similar reference characters. In this arrangement the functions of reactors 14, 15 and the transformer 20 of Fig. 1 have been combined with two inductive windings contained in the monocyclic network. Thus, in this arrangement the capacitor 12 is connected in series with an inductive element 21 thus forming one side of the monocyclic network and an inductive winding 22 the function of which is similar to the function of the inductor 15 of Fig. 1. Similarly the capacitor 13 is connected in series with an inductor 23 to form one side of the monocyclic network, the adjacent side being in the form of the inductive winding 24. The inductive windings 21 and 22 have a close inductive relation with respect to the inductive windings 23 and 24 so that harmonic components introduced into the monocyclic network by the electric valve converting apparatus through the transformer 16 are effectively neutralized and suppressed within the monocyclic network so that no appreciable harmonic components are reflected back into the alternating current circuit 10.

In Fig. 3 a polyphase alternating current circuit 25 is connected at alternate junctures of reactances of different signs of a polyphase monocyclic network comprising a plurality of branches of serially connected reactances of opposite sign, such as capacitor 26, inductor 27, capacitor 28, inductor 29, capacitor 30 and inductor 31. If a constant potential alternating current is impressed across the alternate juncture of the monocyclic network, a constant current alternating current may be obtained from the Y-connected primary winding comprising the inductors 32, 33 and 34, the outer extremities of which are connected to these same junctures of the monocyclic network, and which inductors are inductively coupled to a transformer secondary winding 35. The transformer secondary winding 35 is arranged to supply energy to an electric valve converting apparatus which includes a plurality of electric valves 36 to 41 which supply energy to a direct current circuit 42 through a suitable smoothing reactor 43. Interposed between the electric valve converting means and the transformer secondary winding 35, there is connected in series relation with respective conductors to the transformer winding a plurality of saturable reactors 44 to 46 which are employed to control the rate of change of current through the associated electric valves near or at the end of the conduction period to prevent the establishment of high voltage gradients within the electric valve converting apparatus.

A system embodying such reactors for controlling electric valve means of the type employing ionizable medium is described and claimed in the copending application of Burnice D. Bedford, Serial No. 97,010, filed August 20, 1936, and assigned to the assignee of the present application. In order to prevent harmonic components from appearing in the alternating current supply circuit 25 there is provided a plurality of tertiary inductive windings 47 to 49 associated, respectively, with the inductive windings 32 to 34 which windings form the primary winding of the transformer supplying the electric valve converting apparatus. Each of these windings is connected between an intermediate point on its associated winding to which it is inductively coupled, to an intermediate point on one of the inductors of the monocyclic network. Thus for example, the inductive winding 47 is connected to an intermediate point on the inductive winding 32 and to an intermediate point on the inductive winding 27. Similarly, inductive winding 48 is connected between intermediate points on the inductive windings 33 and 29, and the inductive winding 49 is connected between intermediate points on inductive windings 34 and 31. The upper phase conductor of the alternating current circuit 25 which ordinarily would contain harmonic components corresponding to the harmonic components appearing across the inductive windings 32 and 34 now receive an additional harmonic component corresponding to the components appearing across inductive winding 33 so that the vectorial sum of the harmonic component is substantially zero. Similarly, in the remaining phase conductors of the alternating current circuit the vectorial sums of the harmonic components normally appearing therein are balanced by the introduction of corresponding harmonic components so that the vectorial sums in each of these conductors relative to the harmonic components is substantially zero.

While I have shown and described my invention as applied to certain specific embodiments it will, of course, be understood that I do not wish to be limited thereto, since it is apparent that the principles herein disclosed are susceptible of numerous other applications, and modifications may be made without departing from the spirit and scope of my invention as set forth in the appended claims.

What I claim as new and desire to secure by Letters Patent of the United States is:

1. The combination of an alternating potential circuit, a direct current circuit, one of said circuits having a constant current characteristic, a monocyclic network connected to said alternating potential circuit, an electric valve converting apparatus connected between said network and said direct current circuit, and stationary inductive means connected in circuit with said monocyclic network for neutralizing the harmonic components normally introduced into said alternating potential circuit.

2. The combination of an alternating potential circuit, a direct current circuit, one of said circuits having a constant current characteristic, a static constant potential-constant current transformation network connected to said alternating potential circuit, an electric valve converting apparatus connected between said network and said direct current circuit, and stationary means for introducing into said alternating potential circuit harmonic components of opposite phase and like magnitude to the harmonic components produced therein by said electric valve converting apparatus.

3. The combination of an alternating potential circuit, a direct current circuit, one of said circuits having a constant current characteristic, a monocyclic network connected to said alternating potential circuit, an electric valve converting apparatus connected between said network and said load circuit, and a transformer having one winding connected to said alternating potential circuit and the other winding thereof connected in series between said network and said valve converting apparatus.

4. The combination of an alternating potential circuit, a direct current circuit, an electric valve converting apparatus connected to said direct current circuit, a static constant potential-constant current transformation network connected between said alternating potential circuit and said valve converting apparatus, said network including non-rotating inductive means arranged to introduce into said alternating potential circuit harmonic components of opposite phase and like magnitude to the harmonic components produced therein by said electric valve converting apparatus.

5. The combination of a polyphase alternating potential circuit, a direct current circuit, one of said circuits having a constant current characteristic, an electric valve converting apparatus connected to said direct current circuit, a monocyclic network connected between said alternating potential circuit and said valve apparatus, said network comprising a plurality of branches of serially connected reactances of opposite sign, means connecting alternating junctures of said reactances of different kinds to different ones of the phase conductors of said alternating potential circuit, a transformer having a secondary winding connected to said valve converting apparatus, and a Y-connected primary winding connected to said alternate junctures of said monocyclic network, and a plurality of inductive means associated with said transformer primary winding and said inductive reactances of said monocyclic network for neutralizing the harmonic components produced by said electric valve converting apparatus.

6. The combination of a polyphase alternating potential circuit having a plurality of phase conductors, a direct current circuit, one of said circuits having a constant current characteristic, an electric valve converting apparatus connected to said direct current circuit, a monocyclic network comprising a plurality of branches of serially connected reactances of opposite sign, means for connecting alternate junctures of said reactances of different signs to different ones of said phase conductors of said alternating potential circuits, a transformer connected between said monocyclic networks and said valve converting apparatus, said transformer having a Y-connected primary winding connected to said same alternate junctures of said monocyclic network, a plurality of tertiary windings for said transformer, each of said tertiary windings being connected from an intermediate point on its associated portion of the primary winding of said transformer to an intermediate point on one of said inductive reactances of said monocyclic network for preventing harmonic current from appearing in said alternating potential circuit.

7. The combination of a polyphase alternating potential circuit, a direct current circuit, one of said circuits having a constant current characteristic, an electric valve converting apparatus connected to said direct current circuit, a monocyclic network comprising a plurality of branches of serially connected inductors and capacitors, means connecting alternate junctures of said capacitors and reactors to the conductors of said alternating potential circuits, a transformer connected between said electric valve converting apparatus and said monocyclic network, said transformer having a Y-arranged primary winding connected to the same junctures of said monocyclic network to which said alternating potential conductors are connected, and means inductively associated with said transformer primary windings for introducing into each phase of said alternating potential circuit a harmonic component of such sign and magnitude as to neutralize the vectorial sum of the harmonic component normally appearing therein due to the operation of said electric valve converting apparatus.

8. The combination of an alternating current circuit, a second circuit, electric translating apparatus including a static constant potential-constant current transformation network and an electric valve converting apparatus connected so as to transmit electrical energy between said circuits, and non-rotating inductive means cooperating with said static constant potential-constant current transformation network to introduce into said alternating current circuit harmonic components of opposite phase and like magnitude to the harmonic components produced therein by said electric valve converting apparatus.

9. The combination of an alternating current circuit, a direct current circuit, an electric valve converting apparatus connected so as to transmit electrical energy between said circuits, and means including a plurality of mutually coupled inductive windings associated with said circuits through which the harmonic currents flow in opposite directions thereby to neutralize the harmonic components and prevent them from appearing in said alternating current circuit.

CLODIUS H. WILLIS.